(12) United States Patent
Satou (10) Patent No.: US 12,242,248 B2
(45) Date of Patent: Mar. 4, 2025

(54) NUMERICAL CONTROLLER

(71) Applicant: Fanuc Corporation, Yamanashi (JP)

(72) Inventor: Kasumi Satou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 253 days.

(21) Appl. No.: 17/791,606

(22) PCT Filed: Jan. 14, 2021

(86) PCT No.: PCT/JP2021/001053
§ 371 (c)(1),
(2) Date: Jul. 8, 2022

(87) PCT Pub. No.: WO2021/145378
PCT Pub. Date: Jul. 22, 2021

(65) Prior Publication Data
US 2023/0033414 A1    Feb. 2, 2023

(30) Foreign Application Priority Data

Jan. 16, 2020    (JP) .................................. 2020-005491

(51) Int. Cl.
*G05B 19/4155*    (2006.01)
*B23G 3/00*    (2006.01)

(52) U.S. Cl.
CPC .......... *G05B 19/4155* (2013.01); *B23G 3/00* (2013.01); *G05B 2219/34013* (2013.01); *G05B 2219/50291* (2013.01)

(58) Field of Classification Search
CPC ...... G05B 19/4155; G05B 2219/50291; G05B 2219/34167; G05B 19/4103; B23G 3/00;
(Continued)

(56) References Cited

U.S. PATENT DOCUMENTS 10,589,367 B2    3/2020  Sannomiya et al.
11,086,284 B2    8/2021  Yamamoto
(Continued)

FOREIGN PATENT DOCUMENTS

CN    106001643 A    10/2016
CN    110475637 A    11/2019
(Continued)

OTHER PUBLICATIONS

International Search Report and Written Opinion for International Application No. PCT/JP2021/001053, dated Mar. 16, 2021, 5 pages.
(Continued)

*Primary Examiner* — Mohammad Ali
*Assistant Examiner* — Dhruvkumar Patel
(74) *Attorney, Agent, or Firm* — Buchanan Ingersoll & Rooney PC (57) ABSTRACT

The numerical controller of the invention receives input of a technique for operating a plurality of tools and an operation condition of the operation technique, calculates movement command data including speed information and position information on the plurality of tools, such that respective cutting paths of the plurality of tools intersect, based on the input operation method and operation condition, generates interpolation data based on the movement command data, and controls a motor for driving a machine based on the interpolation data.

5 Claims, 11 Drawing Sheets

(58) Field of Classification Search
CPC ......... B23G 3/12; B23B 2215/68; B23B 1/00; Y02P 90/02
See application file for complete search history.

(56) References Cited

U.S. PATENT DOCUMENTS

| | | | |
|---|---|---|---|
| 2020/0101538 A1 | 4/2020 | Kitakaze et al. | |
| 2021/0382455 A1* | 12/2021 | Sagasaki | G06N 20/00 |
| 2022/0043426 A1* | 2/2022 | Sagasaki | G05B 19/295 |

FOREIGN PATENT DOCUMENTS

| | | | |
|---|---|---|---|
| JP | 064115 A | | 1/1994 |
| JP | H064115 A | * | 1/1994 |
| JP | 10124127 A | | 5/1998 |
| JP | 2019185780 A | | 10/2019 |
| JP | 2019188554 A | * | 10/2019 |
| WO | 2016056526 A1 | | 4/2016 |

OTHER PUBLICATIONS

Office Action (The First Action) issued Jan. 8, 2025, by the State Intellectual Property Office of People's Republic of China in corresponding Chinese Patent Application No. 202180009514.1 and an English machine translation of the Office Action. (22 pages).

\* cited by examiner

NUMERICAL CONTROLLER

CROSS REFERENCE TO RELATED APPLICATIONS

This is the U.S. National Phase application of PCT/JP2021/001053, filed Jan. 14, 2021 which claims priority to Japanese Patent Application No. 2020-005491, filed Jan. 16, 2020, the disclosures of these applications being incorporated herein by reference in their entireties for all purposes.

FIELD OF THE INVENTION

The present invention relates to a numerical controller, and more particularly to a numerical controller having a function of performing threading with a plurality of cooperating tools.

BACKGROUND OF THE INVENTION

In a case where threading is performed on a workpiece, the threading is performed by a blade making a predetermined cut on the workpiece while the workpiece is rotated and the blade being relatively moved in the axial direction of the workpiece. Although the machining may be performed by one tool being moved relative to the workpiece rotation at this time, in many cases, a machine tool equipped with a plurality of shafts is used and a plurality of tools cooperate and move relative to the workpiece to perform the threading.

In conventional threading and turning machining, a tool continues to cut into a workpiece in one direction, and thus the chips resulting from the machining are not divided and are continuously generated as the tool moves. On condition that the machining continues without chip removal, problems arise in the form of chip entanglement in the tool and chip-workpiece contact leading to workpiece damage. Various methods have been used to solve such problems.

International Publication No. 2016/056526, Japanese Unexamined Patent Publication No. 2019-185780, and so on disclose arts for solving the problems by such methods.

SUMMARY OF THE INVENTION

The chips can be divided by adding a swinging operation to the tool movement during the machining. However, the swinging operation leads to an increase in mechanical load, and thus there is a problem that a machine life (ball screw, bearing, and so on) and a tool life are adversely affected. In addition, machining process addition for chip division causes the machining time to become longer than in the case of normal threading. Further, an increase in motor speed is required for a machining time equal to that in the case of normal threading, and then the load of the machining needs to be higher than that in the case of normal threading and another problem arises as the life of the tool tip tends to decrease.

In this regard, there is a demand for a technique with which it is possible to cut off cut chips without causing an increase in machining time and achieve machine and tool life extension.

The numerical controller according to the invention solves the above problem by performing threading while controlling the relative speeds and positions of a plurality of tools such that chips can be divided in a machining method for performing cutting with a machine configured to be capable of controlling the plurality of tools at the same time.

Further, the numerical controller according to the invention controls threading of a workpiece by a machine provided with a plurality of tools based on a program and includes: a chip division information input unit configured to receive input of a technique for operating the plurality of tools and an operation condition of the operation method; a multi-tool operation calculation unit configured to calculate movement command data including speed information and position information on the plurality of tools, such that respective cutting paths of the plurality of tools intersect, based on the operation technique and the operation condition input by the chip division information input unit; an interpolation unit configured to generate interpolation data based on the movement command data; and a servo control unit configured to control a motor for driving the machine based on the interpolation data.

According to the invention, it is possible to perform threading while cutting the cut chips without causing an increase in machining time and achieve machine and tool life extension.

DETAILED DESCRIPTION OF EMBODIMENTS OF THE INVENTION

Hereinafter, embodiments of the invention will be described with reference to the drawings.

Figure 1:
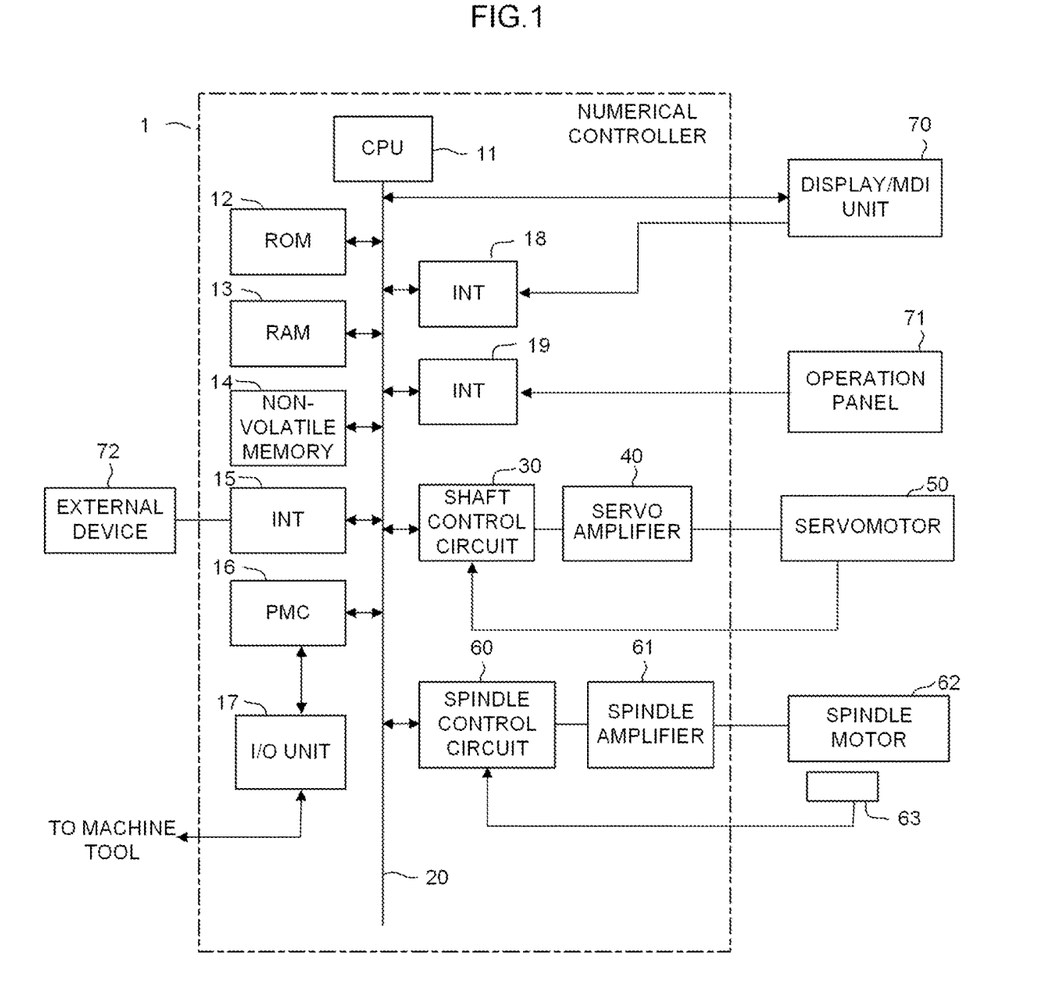
FIG. 1 is a schematic hardware configuration diagram of a numerical controller according to an embodiment of the invention.

FIG. 1 is a schematic hardware configuration diagram illustrating a main part of a numerical controller according to an embodiment of the invention. A numerical controller 1 according to the invention can be mounted as a numerical controller that controls a lathe machine tool based on a program or the like.

A central processing unit (CPU) 11 in the numerical controller 1 according to the present embodiment is a processor that controls the numerical controller 1 as a whole. The numerical controller 1 according to the present embodiment further includes a read only memory (ROM) 12 and a random access memory (RAM) 13. Under such a configuration, the CPU 11 reads out a system program stored in the ROM 12 via a bus 20 and then controls the entire numerical controller 1 in accordance with the system program. Various data are temporarily stored in the RAM 13. Examples of data that can be temporarily stored in the RAM 13 include temporary calculation data and display data and various data input from the outside.

The numerical controller 1 according to the present embodiment further includes a non-volatile memory 14. The non-volatile memory 14 may be configured by a memory backed up by a battery (not shown), a solid state drive (SSD), or the like. By such a configuration, a storage state is maintained even when the numerical controller 1 is off. The non-volatile memory 14 stores a program read from an external device 72 via an interface 15, a program input via a display/MDI unit 70, and the like. The program and various data stored in the non-volatile memory 14 may be loaded into the RAM 13 during executed or used. In addition, various system programs such as a known analysis program are written in advance in the ROM 12.

The numerical controller 1 according to the present embodiment further includes the interface 15 provided for connecting the CPU 11 in the numerical controller 1 with the external device 72 such as a USB device. A program, various parameters, and the like used for controlling the lathe machine tool are read from the external device 72. In addition, the program, the parameters, and the like edited in the numerical controller 1 can be stored in external storage means via the external device 72. The numerical controller 1 according to the present embodiment further includes a programmable machine controller (PMC) 16 and an input/output unit (I/O unit) 17. The PMC 16 performs control by outputting a signal via the I/O unit 17 to the lathe machine tool and a peripheral device for the lathe machine tool with a sequence program built in the numerical controller 1. It should be noted that examples of the peripheral device for the lathe machine tool include a tool changer, an actuator for a robot or the like, and a sensor attached to the lathe machine tool. In addition, the PMC 16 receives a signal from, for example, the peripheral device or various switches in an operation panel in the main body of the lathe machine tool, performs necessary signal processing, and then passes the signal to the CPU 11.

The display/MDI unit 70 is a manual data input device including a display, a keyboard, and the like, and an interface 18 receives a command and data from the keyboard of the display/MDI unit 70 and passes the command and data to the CPU 11. The numerical controller 1 further includes an interface 19 connected to an operation panel 71 having, for example, a manual pulse generator used in manually driving each shaft.

The numerical controller 1 according to the present embodiment further includes a shaft control circuit 30 provided for controlling a shaft of the lathe machine tool and a servo amplifier 40 connected to the shaft control circuit 30. In addition, the servo amplifier 40 is further connected to a servomotor 50 moving the shaft of the lathe machine tool. The shaft control circuit 30 receives a shaft movement command amount from the CPU 11 and outputs a shaft command to the servo amplifier 40. The servo amplifier 40 receives this command to drive the servomotor 50. The shaft servomotor 50 has a built-in position and speed detector. A position and speed feedback signal from the position and speed detector is fed back to the shaft control circuit 30 to perform position and speed feedback control. It should be noted that although one shaft control circuit 30, one servo amplifier 40, and one servomotor 50 are shown in the hardware configuration diagram of FIG. 1, the actual numbers thereof are equal to the number of shafts in the lathe machine tool to be controlled. For example, in the case of controlling a lathe machine tool provided with two cutter holders as in the embodiment of the present application that can be used to execute the operation examples illustrated in FIGS. 3 to 20, two sets of the shaft control circuits 30, the servo amplifiers 40, and the servomotors 50 that respectively drive a first cutter holder to which a first tool is attached in the X-axis and Z-axis directions are prepared along with two sets of the shaft control circuits 30, the servo amplifiers 40, and the servomotors 50 that respectively drive a second cutter holder to which a second tool is attached in the X-axis and Z-axis directions.

The numerical controller 1 according to the present embodiment further includes a spindle control circuit 60 and a spindle amplifier 61 connected to the spindle control circuit. The spindle amplifier 61 is further connected to a spindle motor 62 in the lathe machine tool. The spindle control circuit 60 receives a spindle rotation command and outputs a spindle speed signal to the spindle amplifier 61.

In response to this spindle speed signal, the spindle amplifier 61 rotates the spindle motor 62 in the lathe machine tool at a commanded rotation speed to drive a workpiece. To the spindle motor 62, a position coder 63 is coupled. The position coder 63 outputs a feedback pulse in synchronization with spindle rotation, and this feedback pulse is read by the CPU 11 via the spindle control circuit 60.

Figure 2:
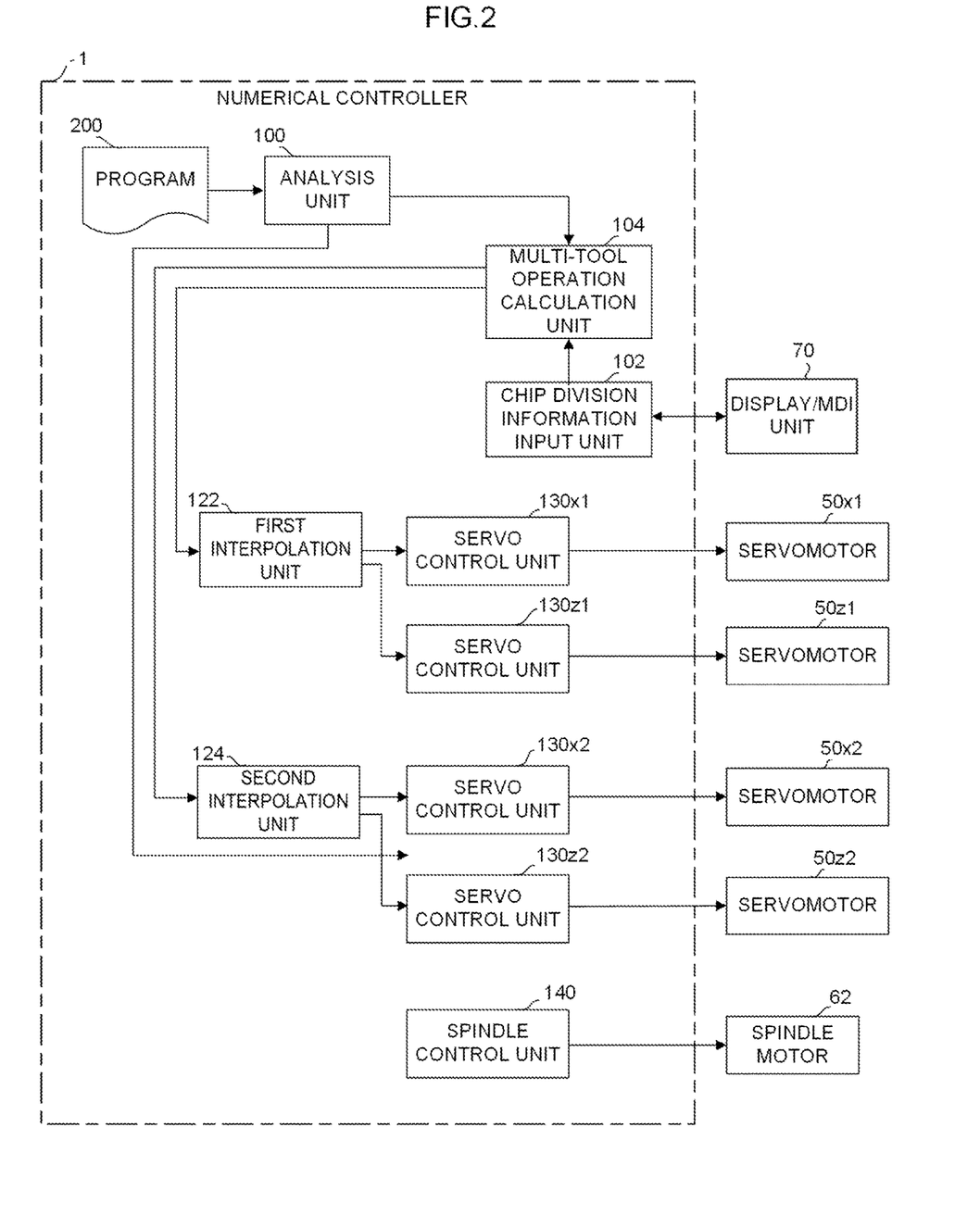
FIG. 2 is a schematic functional block diagram of the numerical controller according to an embodiment of the invention.
Figure 3:
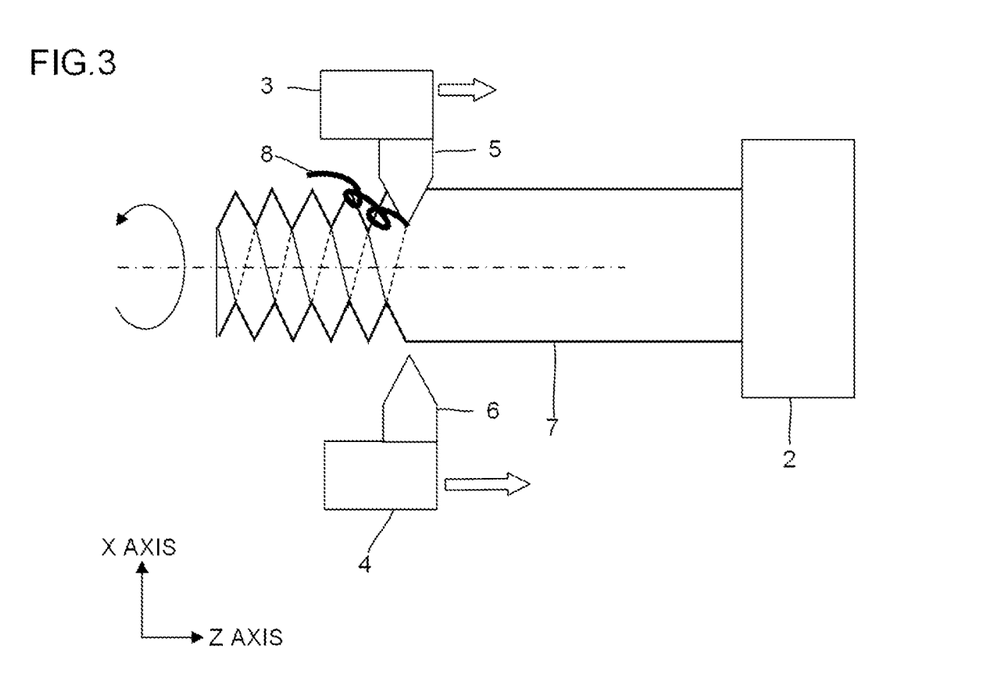
FIG. 3 is a first diagram depicting a machining of a workpiece using a first tool attached to a first cutter holder and a second tool attached to a second cutter holder by a tool front insertion technique that can be calculated using the embodiment of the invention.

FIG. 2 is a schematic functional block diagram of the numerical controller 1 according to one embodiment of the invention.

Each functional block shown in FIG. 2 is actualized by the CPU 11 in the numerical controller 1 shown in FIG. 1 executing a system program and controlling the operation of each part of the numerical controller 1. The numerical controller 1 according to the present embodiment controls the lathe machine tool machining the workpiece attached to the spindle by driving the first cutter holder to which the first tool is attached and the second cutter holder to which the second tool is attached, respectively.

The numerical controller 1 of the present embodiment includes an analysis unit 100, an information input unit 102 (more specifically, chip division information input unit 102 configured to input chip division-related information), and an operation calculation unit 104 (more specifically, multi-tool operation calculation unit 104 configured to execute calculation related to the operation of a plurality of tools). In addition, the numerical controller 1 of the present embodiment includes a first interpolation unit 122, a second interpolation unit 124, servo control units 130$x$1, 130$z$1, 130$x$2, and 130$z$2, and a spindle control unit 140. In addition, the non-volatile memory 14 in the numerical controller 1 stores in advance a program 200 provided for executing the control of machining the workpiece by driving the tools attached to the two cutter holders.

The analysis unit 100 is actualized by the CPU 11 in the numerical controller 1 shown in FIG. 1 executing a system program read from the ROM 12 and arithmetic processing using the RAM 13 and the non-volatile memory 14 being performed mainly by the CPU 11. The analysis unit 100 reads out and analyzes blocks of the program 200 and then generates movement command data for the respective servomotors driving the first and second cutter holders and spindle command data for commanding the rotation speed of the spindle. The analysis unit 100 generates, based on a feed command commanded by the block of the program 200, the movement command data for servomotors 50$x$1 and 50$z$1 driving the first cutter holder and the movement command data for servomotors 50$x$2 and 50$z$2 driving the second cutter holder. In addition, the analysis unit 100 generates the spindle command data based on the spindle rotation command commanded by the block of the program 200.

The chip division information input unit 102 is actualized by the CPU 11 in the numerical controller 1 shown in FIG. 1 executing a system program read from the ROM 12 and arithmetic processing using the RAM 13 and the non-volatile memory 14 and input/output processing using the interface 18 and the display/MDI unit 70 being performed mainly by the CPU 11. The chip division information input unit 102 displays a setting screen to a worker via the display/MDI unit 70 for the worker to input how to operate the first and second cutter holders and conditions required for the operation. With the chip division information input unit 102, the worker can select an operation technique such as (1) tool front insertion technique, (2) tool vibration technique, (3) tool rear insertion technique, and (4) combination technique, which will be described later. In addition, the chip division information input unit 102 allows the worker to set a chip division length (so to speak, chip length). The chip length may be set by specifying a lead count or a coordinate value. The information input by the chip division information input unit 102 is output to the multi-tool operation calculation unit 104.

The multi-tool operation calculation unit 104 is actualized by the CPU 11 of the numerical controller 1 shown in FIG. 1 executing a system program read from the ROM 12 and arithmetic processing using the RAM 13 and the non-volatile memory 14 being performed mainly by the CPU 11. The multi-tool operation calculation unit 104 calculates the operation of each tool corresponding to the information input from the chip division information input unit 102 based on the movement command data generated by the analysis unit 100. It should be noted that examples of the information input from the chip division information input unit 102 include the selected operation method. However, the chip length and various types of information not limited to these examples can also be input from the chip division information input unit 102. The multi-tool operation calculation unit 104 calculates the operation of each tool by calculating the speeds and positions of the tools at which the respective cutting paths of the tools intersect. The operation of each tool calculated by the multi-tool operation calculation unit 104 is one in which the chips generated as a result of machining by each tool are divided at the chip length input by the chip division information input unit 102. The operation of each tool calculated by the multi-tool operation calculation unit 104 is output to the first interpolation unit 122 and the second interpolation unit 124 as movement command data. The operation of each tool calculated by the multi-tool operation calculation unit 104 will be described later.

The first interpolation unit 122 and the second interpolation unit 124 are actualized by the CPU 11 of the numerical controller 1 shown in FIG. 1 executing a system program read from the ROM 12 and arithmetic processing using the RAM 13 and the non-volatile memory 14 being performed mainly by the CPU 11.

The first interpolation unit 122 generates, based on the movement command data generated by the analysis unit 100, interpolation data in which a point on the command path of the first tool attached to the first cutter holder commanded by the movement command data is interpolation-calculated with an interpolation cycle (so to speak, control cycle). In addition, the second interpolation unit 124 generates, based on the movement command data generated by the analysis unit 100, interpolation data in which a point on the command path of the second tool attached to the second cutter holder commanded by the movement command data is interpolation-calculated with an interpolation cycle. The interpolation processing by the first interpolation unit 122 and the second interpolation unit 124 is executed every interpolation cycle.

The servo control units 130$x$1 and 130$z$1 are actualized by the CPU 11 in the numerical controller 1 shown in FIG. 1 executing a system program read from the ROM 12, arithmetic processing using the RAM 13 and the non-volatile memory 14 being performed mainly by the CPU 11, and the shaft control circuit 30 and the servo amplifier 40 performing control processing on the servomotor 50. The servo control units 130$x$1 and 130$z$1 drive the first cutter holder in the machine to be controlled by controlling each of the servomotor 50$x$1 that drives the first cutter holder in the X-axis direction and the servomotor 50$z$1 that drives the first cutter holder in the Z-axis direction based on the interpolation data generated by the first interpolation unit 122.

In addition, the servo control units 130$x$2 and 130$z$2 are actualized by the CPU 11 in the numerical controller 1 shown in FIG. 1 executing a system program read from the ROM 12, arithmetic processing using the RAM 13 and the non-volatile memory 14 being performed mainly by the CPU 11, and the shaft control circuit 30 and the servo amplifier 40 performing control processing on the servomotor 50. The servo control units 130x2 and 130z2 drive the second cutter holder of the machine to be controlled by controlling each of the servomotor 50x2 that drives the first cutter holder in the X-axis direction and the servomotor 50z2 that drives the first cutter holder in the Z-axis direction based on the interpolation data generated by the second interpolation unit 124.

The spindle control unit 140 is realized by the CPU 11 of the numerical controller 1 illustrated in FIG. 1 executing a system program read from the ROM 12, arithmetic processing using the RAM 13 and the non-volatile memory 14 being performed mainly by the CPU 11, and the spindle control circuit 60 and the spindle amplifier 61 performing control processing on the spindle motor 62. The spindle control unit 140 controls the spindle motor 62 that rotates the spindle of the machine to be controlled based on the spindle command data generated by the analysis unit 100.

The followings are some examples of the operation of each tool calculated by the multi-tool operation calculation unit 104 provided in the embodiment of the invention.

FIGS. 3 to 8 are a series of diagrams illustrating states where a workpiece 7 is machined using the (1) tool front insertion technique calculated by the multi-tool operation calculation unit 104 with a first tool 5 attached to a first cutter holder 3, and a second tool 6 attached to a second cutter holder 4.

As for the tool front insertion method, threading is first started by one of the tools. In the state illustrated in FIG. 3, the workpiece 7 attached to a headstock 2 and rotating is cut (that is, threaded) by the first tool 5 attached to the first cutter holder 3. At this time, the second tool 6 attached to the second cutter holder moves in the Z-axis direction in a non-cutting state at a speed overtaking the first tool 5 at an X-axis position of non-contact with the workpiece 7. In this state, chips 8 are generated from the threading position of the first tool 5.

Figure 4:
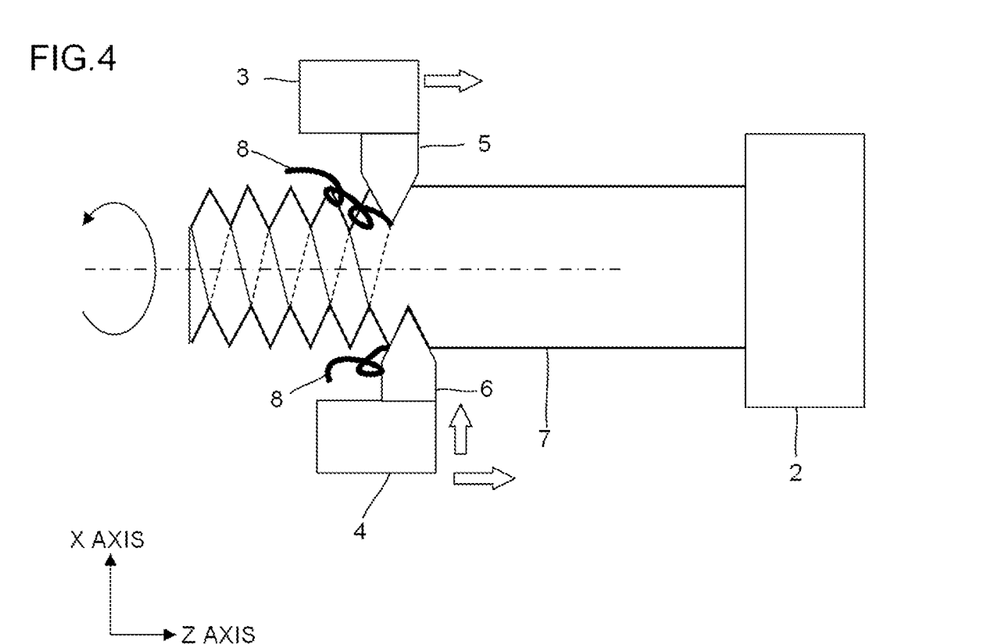
FIG. 4 is a second diagram depicting the workpiece machining by the first tool and the second tool and using the tool front insertion technique.

Next, as illustrated in FIG. 4, when the second tool 6 reaches the cutting start point positioned ahead by half rotation of the spindle when viewed from the first tool 5 while the first tool 5 cuts the workpiece 7, the second cutter holder 4 moves in the X-axis direction after setting the speed of movement in the Z-axis direction to the speed of cutting, and the second tool 6 starts cutting the workpiece 7. The cutting start point of the second tool 6 is a position where the cutting length from the cutting start position of the first tool 5 is substantially the same as the chip length input by the chip division information input unit 102. At this stage, the workpiece 7 is machined by both the first tool 5 and the second tool 6.

Figure 5:
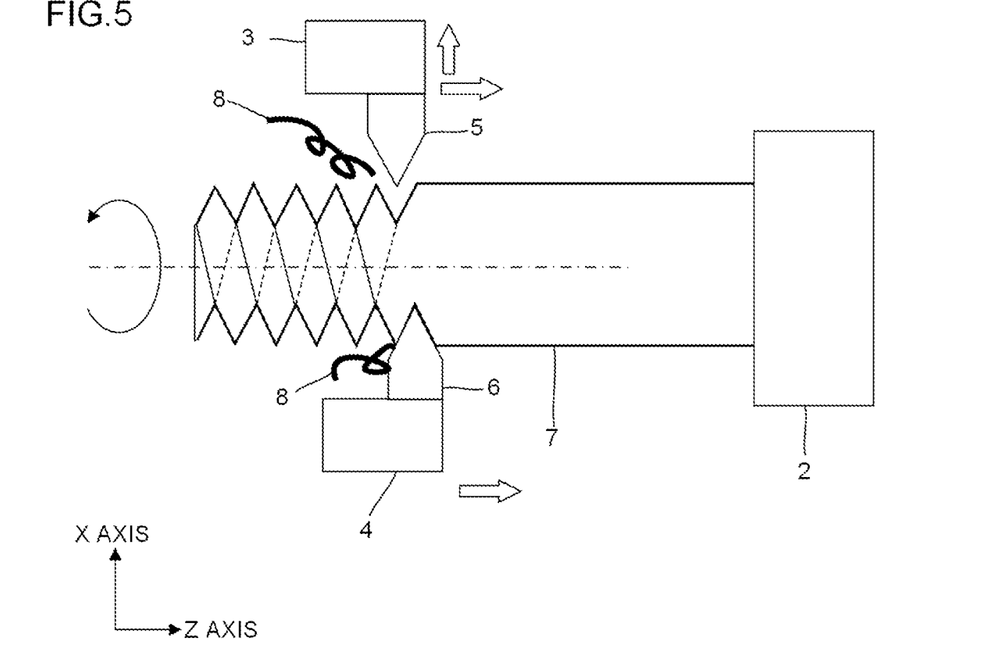
FIG. 5 is a third diagram depicting the workpiece machining by the first tool and the second tool and using the tool front insertion technique.

Subsequently, as illustrated in FIG. 5, when the first tool 5 reaches the cutting start point of the second tool 6, the chips generated as a result of the cutting by the first tool 5 are divided by the cutting groove of the second tool 6. When the cutting point of the first tool 5 reaches the cutting start point of the second tool 6, the first cutter holder 3 moves in the X-axis direction, thereby the first tool 5 enters a non-cutting state.

Figure 6:
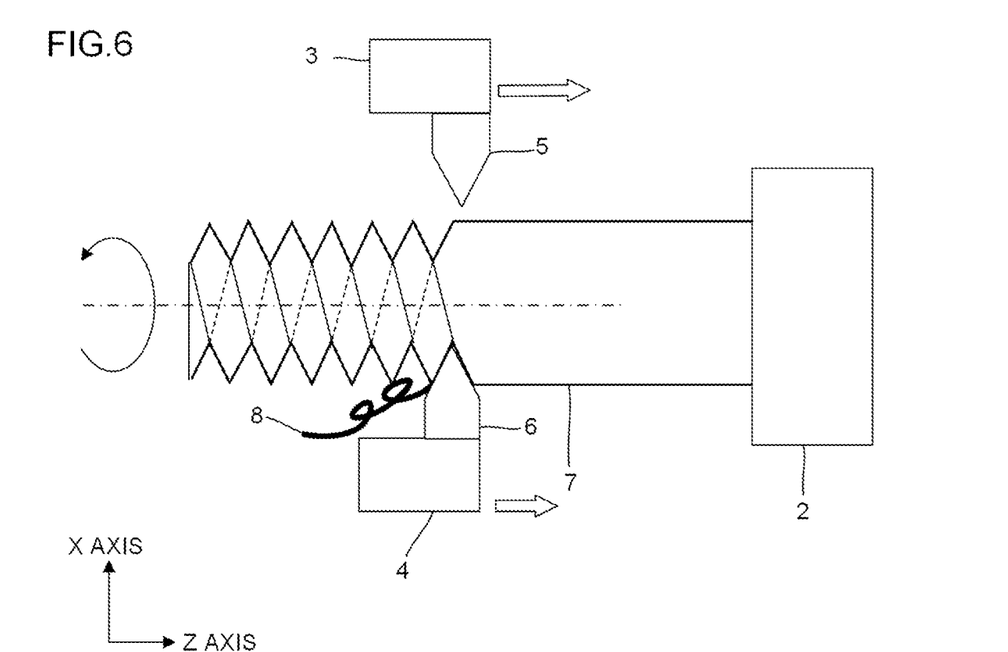
FIG. 6 is a fourth diagram depicting the workpiece machining by the first tool and the second tool and using the tool front insertion technique.
Figure 7:
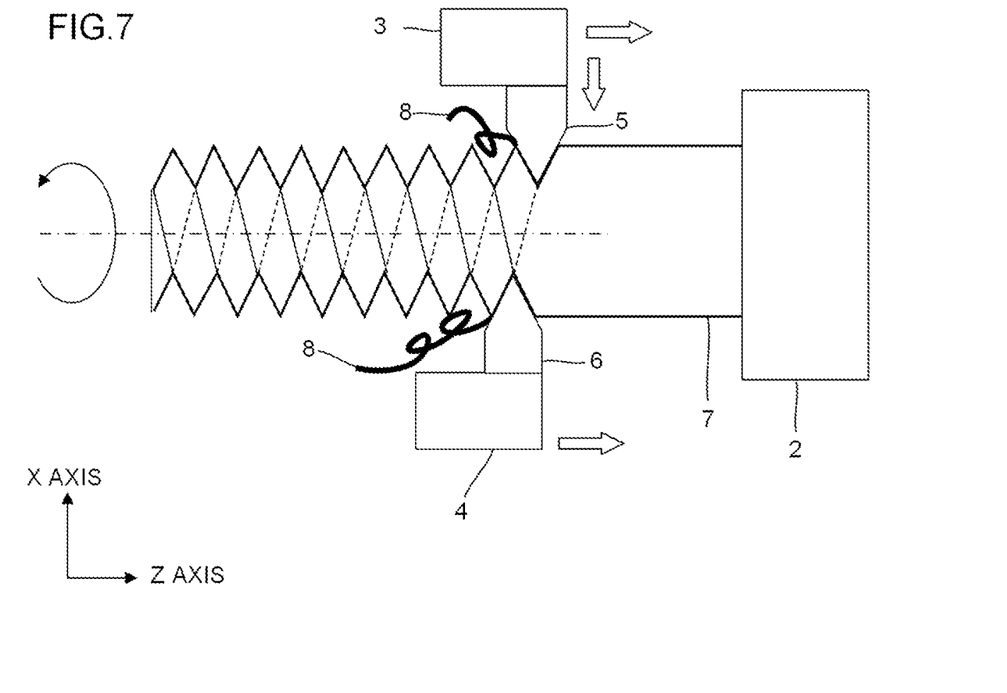
FIG. 7 is a fifth diagram depicting the workpiece machining by the first tool and the second tool and using the tool front insertion technique.

With the first tool 5 in the non-cutting state, as illustrated in FIG. 6, the first cutter holder 3 moves in the Z-axis direction in the non-cutting state at a speed overtaking the second tool 6. Then, when the first tool 5 reaches the cutting start point positioned ahead by half rotation of the spindle when viewed from the second tool 6, the first cutter holder 3 moves in the X-axis direction after setting the speed of movement in the Z-axis direction to the speed of cutting and then the first tool 5 starts cutting as illustrated in FIG. 7. The cutting start point of the first tool 5 is a position where the cutting length from the cutting start position of the second tool 6 is substantially the same as the chip length input by the chip division information input unit 102. At this stage, the workpiece 7 is re-machined by both the first tool 5 and the second tool 6.

Figure 8:
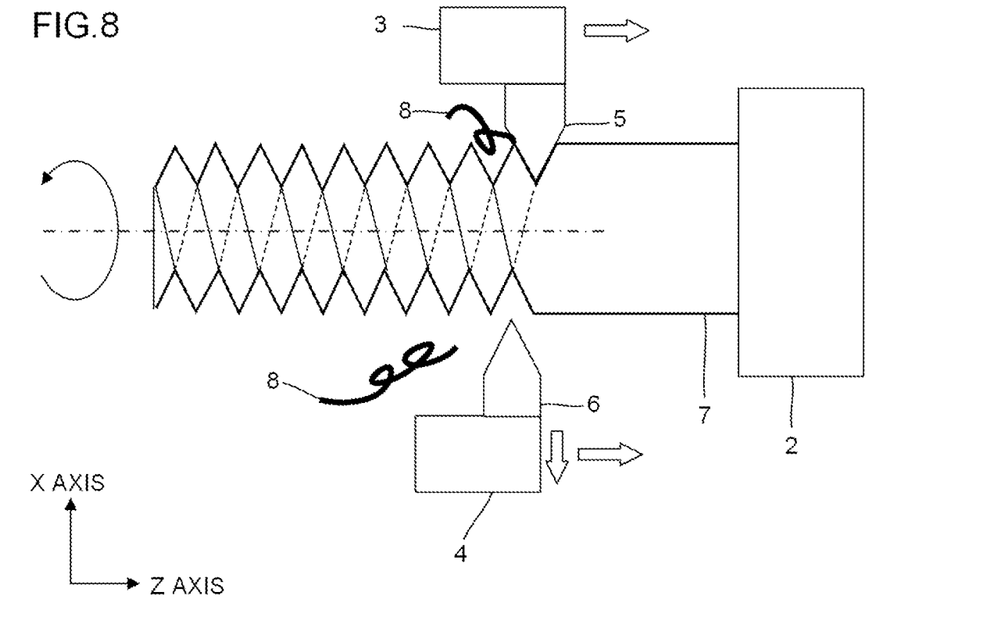
FIG. 8 is a sixth diagram depicting the workpiece machining by the first tool and the second tool and using the tool front insertion technique.

Subsequently, as illustrated in FIG. 8, when the second tool 6 reaches the cutting start point of the first tool 5, the chips generated as a result of the cutting by the second tool 6 are divided by the cutting groove of the first tool 5. When the cutting point of the second tool 6 reaches the cutting start point of the first tool 5, the second cutter holder 4 moves in the X-axis direction and then the second tool 6 enters a non-cutting state.

As described above, by the tool front insertion technique, the first tool 5 and the second tool 6 alternately machine the workpiece 7 by repeating the operations illustrated in FIGS. 3 to 8. By this operation method, the chips generated as a result of the cutting by the first tool 5 are divided by the cutting groove by the second tool 6. In addition, the chips generated as a result of the cutting by the second tool 6 are divided by the cutting groove by the first tool 5. By setting the Z-axis-direction movement speeds of the first cutter holder 3 and the second cutter holder 4 in machining the workpiece 7 to cutting feed rates commanded by the program 200 or the like, the machining time is almost the same as that in the case of normal threading (strictly speaking, the machining time slightly decreases to the extent of the front insertion). In addition, it is not necessary to perform a swinging operation or an operation similar thereto, and thus no heavy load is applied to the turning machine tool and each tool. Further, because the machining of the workpiece 7 is alternately performed by the first tool 5 and the second tool 6, machining burden can be distributed to the respective tools. For example, the non-cutting time of the tool is longer than in the case of continuous machining, and thus the heat generated during the machining can be sufficiently removed and tool life extension is also expectable by this technique.

Figure 9:
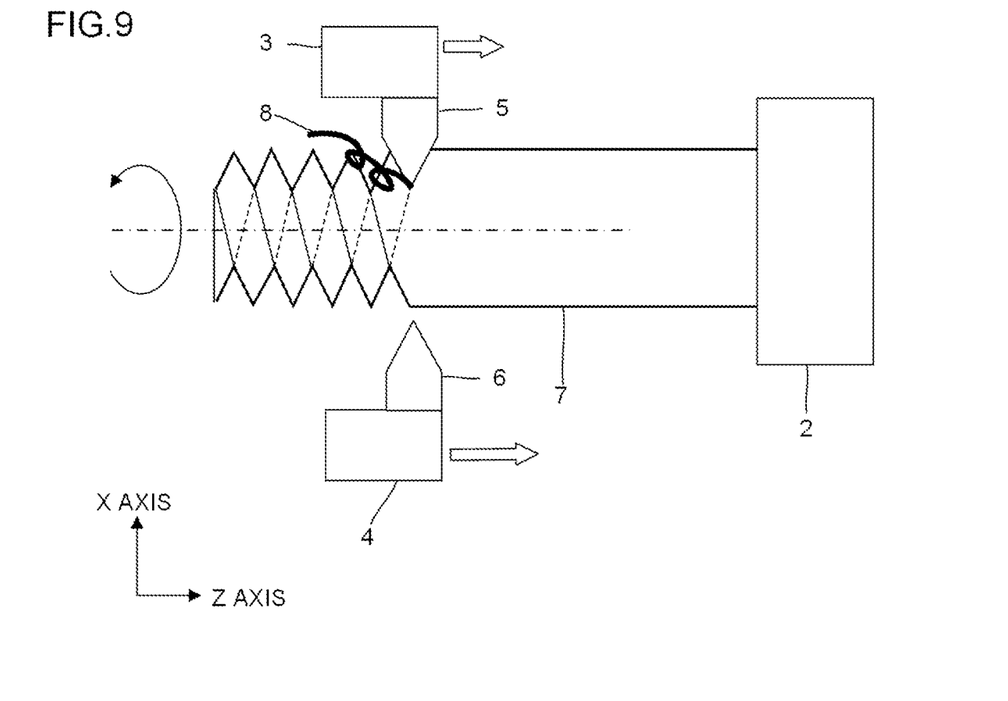
FIG. 9 is a first diagram depicting a machining of the workpiece using the first tool attached to the first cutter holder and the second tool attached to the second cutter holder by a tool vibration technique that can be calculated using the embodiment of the invention.
Figure 10:
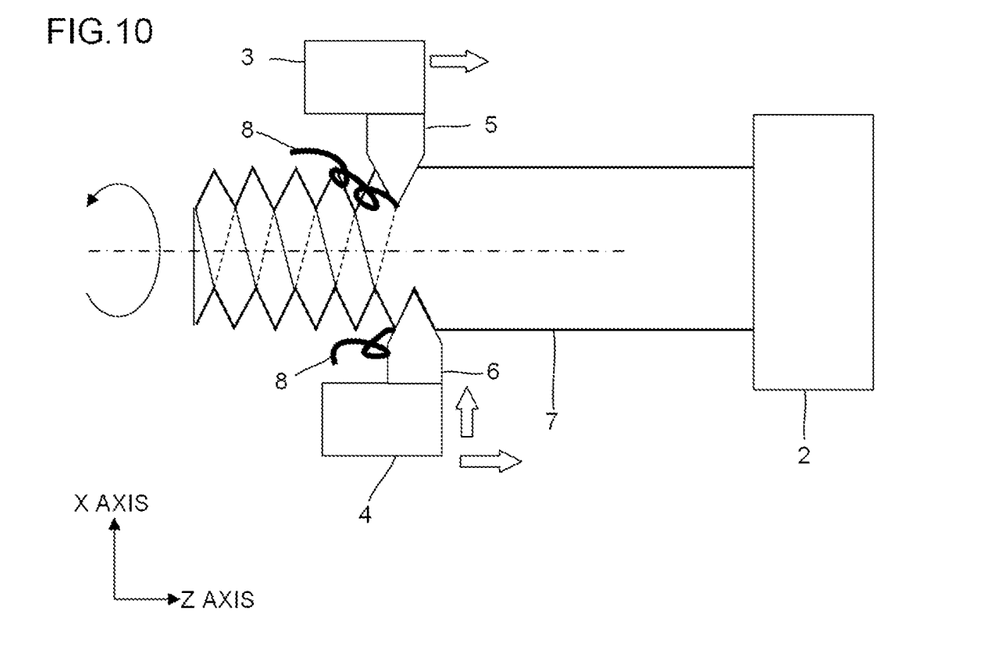
FIG. 10 is a second diagram depicting the workpiece machining by the first tool and the second tool and using the tool vibration technique.
Figure 11:
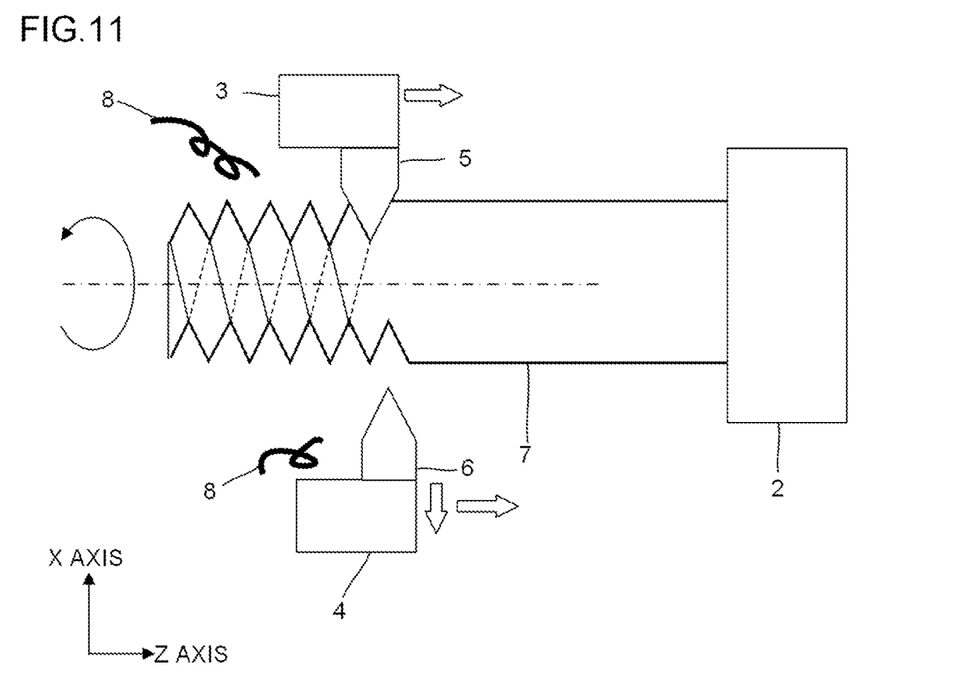
FIG. 11 is a third diagram depicting the workpiece machining by the first tool and the second tool and using the tool vibration technique.
Figure 12:
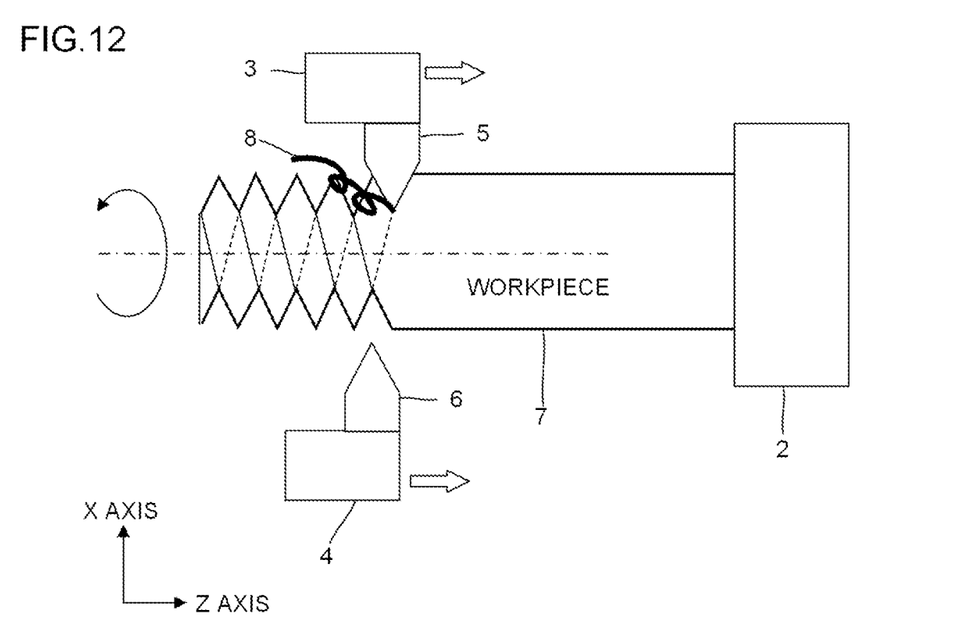
FIG. 12 is a first diagram depicting a machining of the workpiece using the first tool attached to the first cutter holder and the second tool attached to the second cutter holder by a tool rear insertion technique that can be calculated using the embodiment of the invention.

FIGS. 9 to 11 are a series of diagrams illustrating states where the workpiece 7 is machined using the (2) tool vibration technique calculated by the multi-tool operation calculation unit 104 with the first tool 5 attached to the first cutter holder 3 and the second tool 6 attached to the second cutter holder 4.

As for the tool vibration technique, one tool performs threading for the most part. In the state illustrated in FIG. 9, the workpiece 7 attached to the headstock 2 and rotating is cut (threaded) by the first tool 5 attached to the first cutter holder 3. At this time, the second tool 6 attached to the second cutter holder moves in the Z-axis direction in a non-cutting state at a speed overtaking the first tool 5 at an X-axis position of non-contact with the workpiece 7. In this state, the chips 8 are generated from the threading position of the first tool 5.

Next, as illustrated in FIG. 10, when the second tool 6 reaches the cutting start point ahead by half rotation of the spindle when viewed from the first tool 5 while the first tool 5 cuts the workpiece 7, the second cutter holder 4 moves in the X-axis direction after setting the speed of movement in the Z-axis direction to the speed of cutting, and the second tool 6 starts cutting the workpiece 7. The cutting start point of the second tool 6 is a position where the cutting length from the cutting start position of the first tool 5 is substantially the same as the chip length input by the chip division information input unit 102. At this stage, the workpiece 7 is machined by both the first tool 5 and the second tool 6.

Subsequently, as illustrated in FIG. 11, the second cutter holder 4 moves in the X-axis direction and the second tool 6 reenters a non-cutting state. When the first tool 5 reaches the cutting start point of the second tool 6, the chips generated as a result of the cutting by the first tool 5 are divided by the cutting groove of the second tool 6.

As described above, in the tool vibration technique, the workpiece 7 is machined by the first tool 5 and the chips are divided by the second tool 6 with repeating the operations illustrated in FIGS. 9 to 11. By setting the Z-axis-direction movement speed of the first cutter holder 3 in machining the workpiece 7 to a cutting feed rate commanded by the program 200 or the like, the machining time of the workpiece 7 is the same as that in the case of normal threading. The second tool 6 performs the chip division operation within the range of a normal cutter holder operation, and thus no heavy load is applied to the turning machine tool or each tool. In addition, by using a tool resistant to vibration as the second tool 6, the burden on the machine as a whole can be reduced. It should be noted that the roles of the first tool 5 and the second tool 6 may be reversed although only the first tool 5 is configured to perform continuous cutting and the second tool 6 is configured to temporarily enter a cutting point in the above example. In addition, by switching the roles of the first tool 5 and the second tool 6 at a tool load accumulation timing, burden dispersion to the respective tools is also possible.

FIGS. 12 to 15 are diagrams illustrating states where the workpiece 7 is machined using the (3) tool rear insertion technique calculated by the multi-tool operation calculation unit 104 with the first tool 5 attached to the first cutter holder 3 and the second tool 6 attached to the second cutter holder 4.

As for the tool rear insertion technique, threading is first started by one of the tools. In the state illustrated in FIG. 12, the workpiece 7 attached to the headstock 2 and rotating is cut (threaded) by the first tool 5 attached to the first cutter holder 3. At this time, the second tool 6 attached to the second cutter holder moves in the Z-axis direction in a non-cutting state behind the first tool 5 at an X-axis position of non-contact with the workpiece 7. In this state, the chips 8 are generated from the threading position of the first tool 5.

Figure 13:
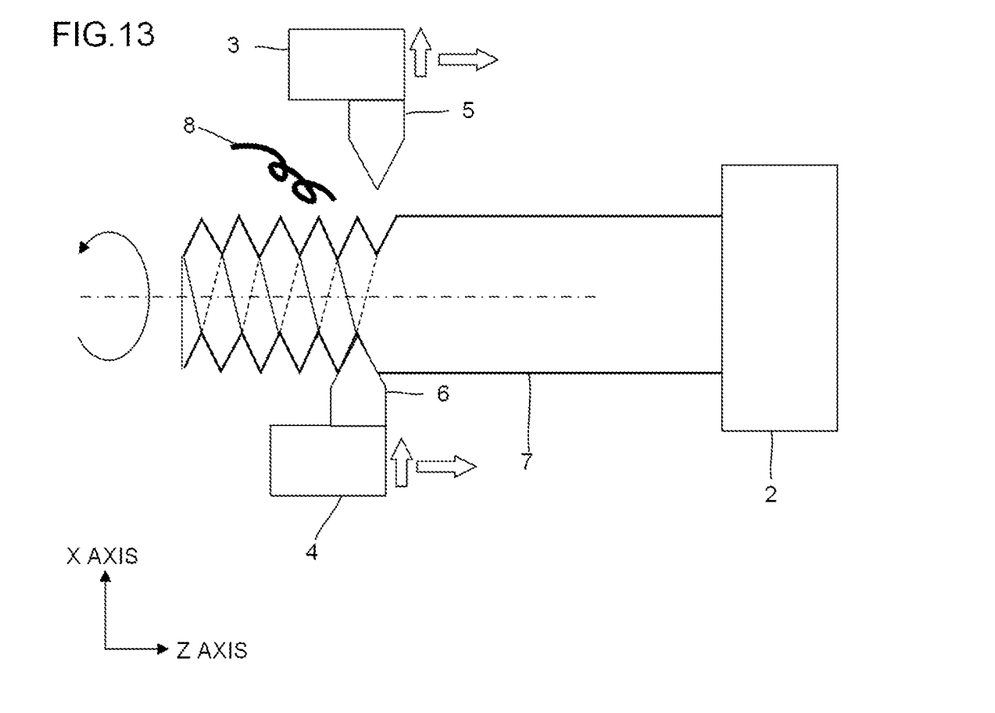
FIG. 13 is a second diagram depicting the workpiece machining by the first tool and the second tool and using the tool rear insertion technique.

Next, as illustrated in FIG. 13, when the second tool 6 approaches the cutting start point, the first cutter holder 3 moves in the X-axis direction and then the first tool 5 enters a non-cutting state. Then, until the workpiece 7 rotates half, the second cutter holder 4 moves in the X-axis direction after setting the speed of movement in the Z-axis direction to the speed of cutting, and the second tool 6 is inserted into the cutting groove cut by the first tool 5. Then, when the workpiece 7 rotates half, the second tool 6 starts cutting at the position where the cutting by the first tool 5 is interrupted.

The chips generated as a result of the cutting by the first tool 5 are divided when the first tool 5 is retracted. The cutting start point of the second tool 6 is a position where the cutting length from the cutting start position of the first tool 5 is substantially the same as the chip length input by the chip division information input unit 102.

Figure 14:
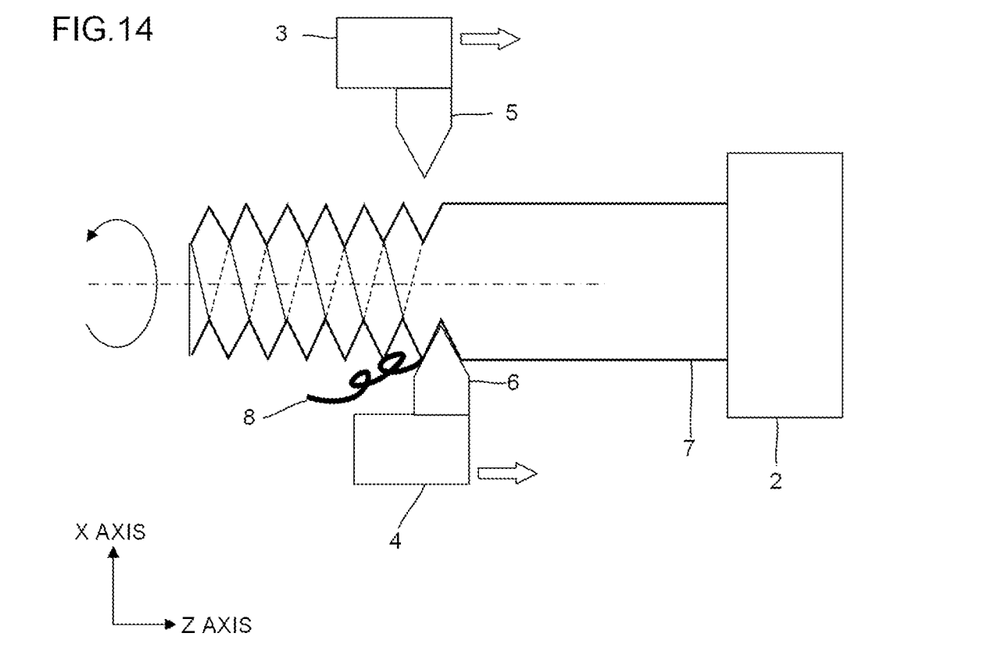
FIG. 14 is a third diagram depicting the workpiece machining by the first tool and the second tool and using the tool rear insertion technique.
Figure 15:
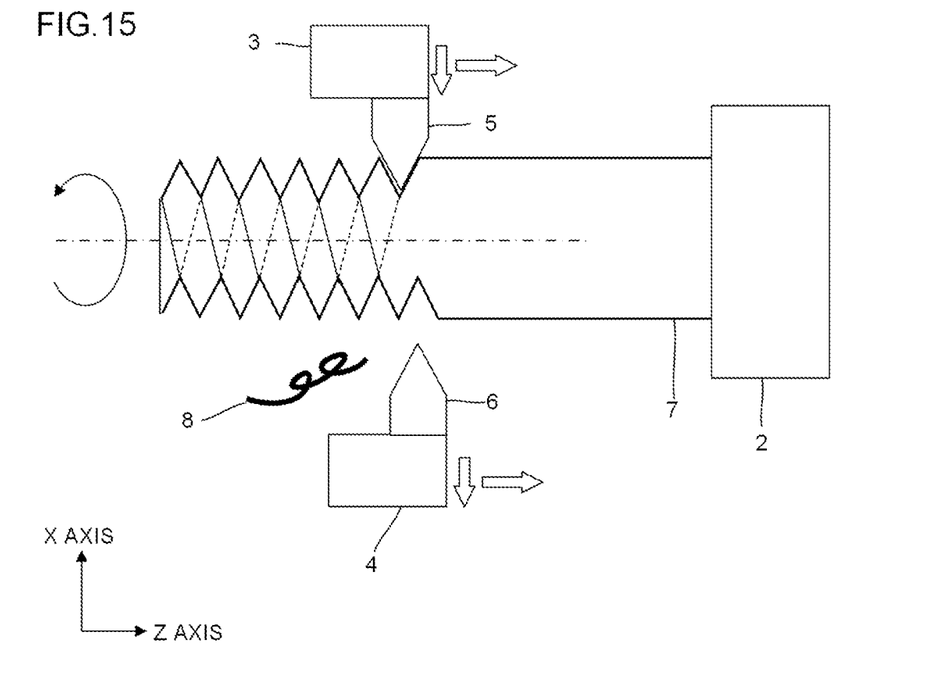
FIG. 15 is a fourth diagram depicting the workpiece machining by the first tool and the second tool and using the tool rear insertion technique.

With the first tool 5 in the non-cutting state, the first cutter holder 3 moves in the Z-axis direction while adjusting the speed as illustrated in FIG. 14. Then, when the first tool 5 approaches the next cutting start point, the second cutter holder 4 moves in the X-axis direction and the second tool 6 enters a non-cutting state as illustrated in FIG. 15. Then, until the workpiece 7 rotates half, the first cutter holder 3 moves in the X-axis direction after setting the speed of movement in the Z-axis direction to the speed of cutting, and the first tool 5 is inserted into the cutting groove cut by the second tool 6. Then, when the workpiece 7 rotates half, the first tool 5 starts cutting at the position where the cutting by the second tool 6 is interrupted. The chips generated as a result of the cutting by the second tool 6 are divided when the second tool 6 is retracted. The cutting start point of the first tool 5 is a position where the cutting length from the cutting start position of the second tool 6 is substantially the same as the chip length input by the chip division information input unit 102.

As described above, by the tool rear insertion technique, the first tool 5 and the second tool 6 alternately machine the workpiece 7 by repeating the operations illustrated in FIGS. 12 to 15. By this operation technique, the chips generated as a result of the cutting by the first tool 5 are divided when the first tool 5 is retracted. In addition, the chips generated as a result of the cutting by the second tool 6 are divided when the second tool 6 is retracted. By setting the Z-axis-direction movement speeds of the first cutter holder 3 and the second cutter holder 4 in machining the workpiece 7 to cutting feed rates commanded by the program 200 or the like, the machining time of the workpiece 7 is substantially the same as that in the case of normal threading.

In addition, it is not necessary to perform a swinging operation or the like, and thus no heavy load is applied to the turning machine tool or each tool. Further, because the machining of the workpiece 7 is alternately performed by the first tool and the second tool, machining burden can be distributed to the respective tools. For example, the non-cutting time of the tool is longer than in the case of continuous machining, and thus sufficient heat can be taken off during the machining and tool life extension is also expectable. In addition, no machining is performed in the direction of cutting by the tool (workpiece radial direction), and thus burden on the tools is particularly reduced.

FIGS. 16 to 20 are diagrams illustrating states where the workpiece 7 is machined using the (4) combination technique calculated by the multi-tool operation calculation unit 104, the first tool 5 attached to the first cutter holder 3, and the second tool 6 attached to the second cutter holder 4. The combination technique is a combination of the tool operations of the (1) tool front insertion technique and the (3) tool rear insertion technique.

Figure 16:
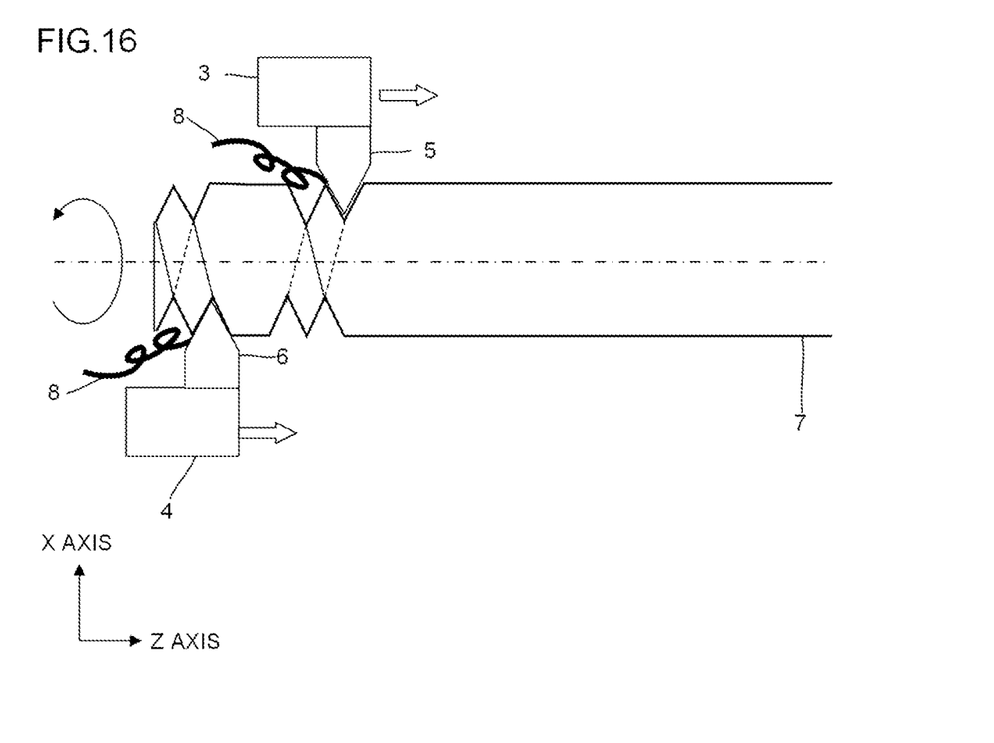
FIG. 16 is a first diagram depicting a machining of the workpiece using the first tool attached to the first cutter holder and the second tool attached to the second cutter holder by a combination technique that can be calculated using the embodiment of the invention.

As for the combination technique, threading is started by both the first tool 5 and the second tool 6 as illustrated in FIG. 16. In FIG. 16, the cutting position of the first tool 5 is disposed so as to be positioned in front of the cutting position of the second tool 6 in the Z-axis direction. The cutting position of each of the first tool 5 and then the second tool 6 is a position where the cutting length is substantially the same as the chip length input by the chip division information input unit 102.

Figure 17:
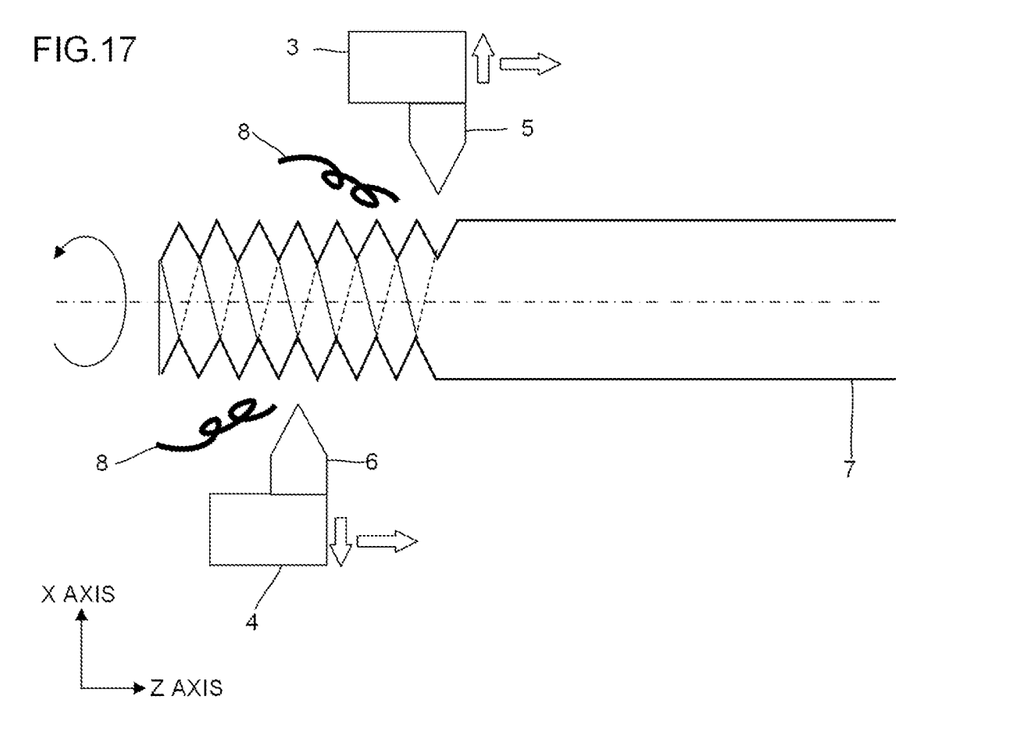
FIG. 17 is a second diagram depicting the workpiece machining by the first tool and the second tool and using the combination technique.

When the cutting position of the second tool 6 reaches the cutting start position of the first tool 5, as illustrated in FIG. 17, each of the first cutter holder 3 and the second cutter holder 4 moves in the X-axis direction and then the first tool 5 and the second tool 6 enter a non-cutting state. At this time, the chips 8 generated as a result of the cutting by the first tool 5 and the second tool 6 are divided respectively.

Figure 18:
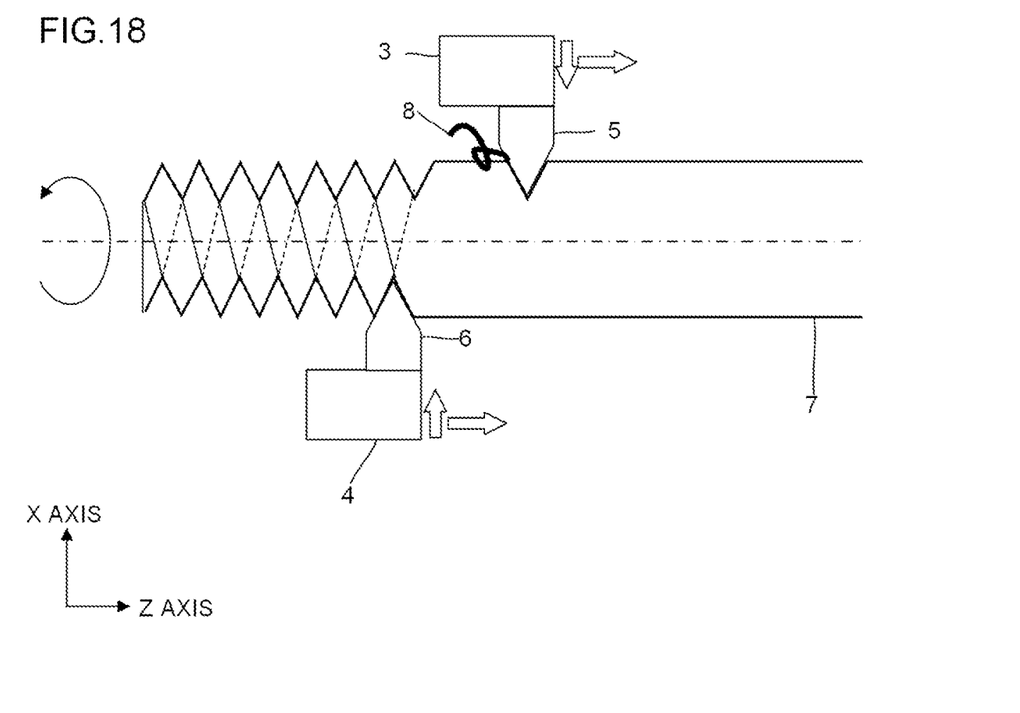
FIG. 18 is a third diagram depicting the workpiece machining by the first tool and the second tool and using the combination technique.
Figure 19:
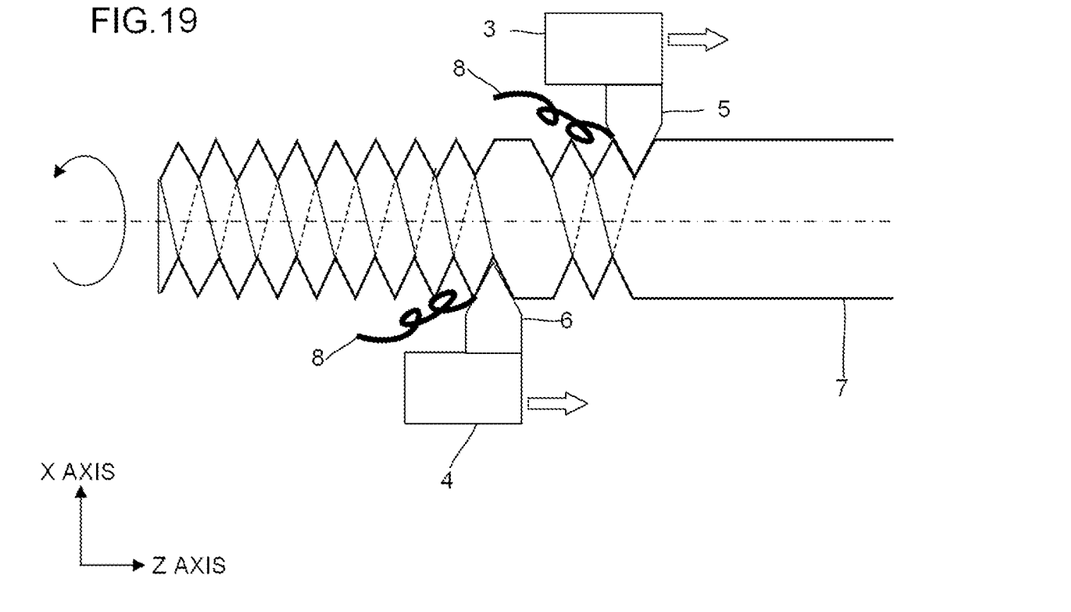
FIG. 19 is a fourth diagram depicting the workpiece machining by the first tool and the second tool and using the combination technique.

Subsequently, as illustrated in FIG. 18, the second tool 6 is moved to the cutting end point of the first tool 5 with the relative front-back relationship between the first tool 5 and the second tool 6 maintained. Then, at the respective positions, the first cutter holder 3 and the second cutter holder 4 move in the X-axis direction and the first tool 5 and the second tool 6 start cutting (see FIG. 19).

Figure 20:
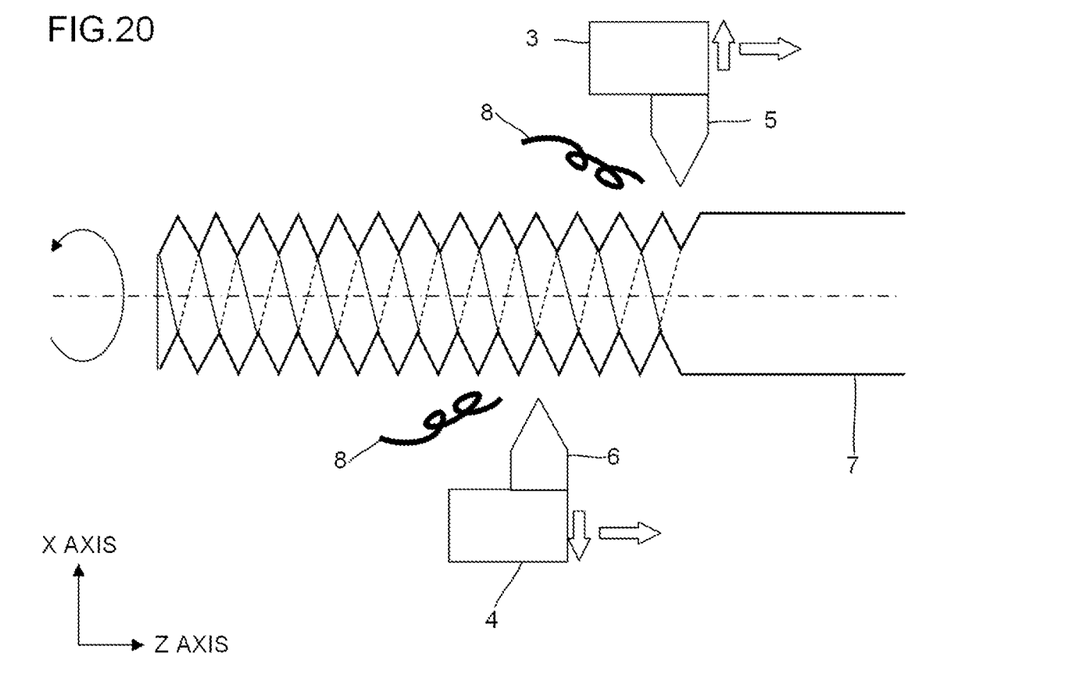
FIG. 20 is a fifth diagram depicting the workpiece machining by the first tool and the second tool and using the combination technique.

Then, when the cutting position of the second tool 6 reaches the cutting start position of the first tool 5, the first cutter holder 3 and then the second cutter holder 4 move in the X-axis direction and the first tool 5 and the second tool 6 enter a non-cutting state as illustrated in FIG. 20. At this time, the chips 8 generated as a result of the cutting by the first tool 5 and the second tool 6 are divided respectively.

As described above, in the combination technique, each of the first tool 5 and the second tool 6 machines the workpiece 7 by repeating the operations illustrated in FIGS. 16 to 20. By this operation technique, the chips generated as a result of the cutting by the first tool 5 are divided when the first tool 5 is retracted. In addition, the chips generated as a result of the cutting by the second tool 6 are divided by the cutting groove by the first tool 5. The time for machining the workpiece 7 is sufficiently shorter than in the case of single-tool machining even with the tool movement time in the non-cutting state (that is, rapid traverse time) taken into consideration. In particular, machining can be efficiently performed when the cutting distance in single cutting is long. By setting to the cutting feed rate commanded by the threading program 200 or the like, the machining time is approximately halved as compared with the case of normal threading. In addition, because it is not necessary to perform a swinging operation or the like, no heavy load is applied to the turning machine tool and each tool. Further, because the machining of the workpiece 7 is distributed to the first tool and the second tool, the burden of machining can be distributed to the respective tools. In addition, by this technique, the machining heat can be sufficiently removed during the non-cutting time of the tool and thus tool life extension is also expectable.

One embodiment of the invention has been described above together with some tool operation examples actualized by the embodiment. However, the invention is not limited to the above description of the embodiment and operation examples and can be implemented in various aspects by being changed appropriately.

For example, in the exemplary configuration of the embodiment and the operation examples described above, the machine to be controlled by the numerical controller 1 is configured such that the first cutter holder 3 and the second cutter holder 4 are at opposite positions. However, the cutter holders and the tools may be disposed in any manner insofar as the first tool 5 and the second tool 6 are capable of performing threading in cooperation with each other.

In addition, in the exemplary configuration of the embodiment and the operation examples described above, the machine to be controlled by the numerical controller 1 is configured to perform threading using two cutter holders and two tools. However, in an alternative configuration, threading may be performed using three or more cutter holders and three or more tools. Even in this case, the multi-tool operation calculation unit 104 in the numerical controller 1 may create movement command data for each tool such that the cutting paths of the respective tools intersect.

In addition, in the exemplary configuration of the embodiment and the operation examples described above, a machine configured to perform threading using two movable cutter holders is controlled by the numerical controller 1. However, regardless of the above description, threading may be performed using one movable cutter holder, one fixed cutter holder, and one movable headstock. Even in this case, the multi-tool operation calculation unit 104 may create movement command data for each tool such that the cutting paths of the respective tools intersect. Even in this case, it is a matter of course that the number of cutter holders used for threading may be 3 or more.

The invention claimed is:

1. A numerical controller for controlling threading of a workpiece by a machine provided with a plurality of tools based on a program, the numerical controller comprising:
   a chip division information input unit configured to receive input of a technique for operating the plurality of tools and an operation condition of the operation technique;
   a multi-tool operation calculation unit configured to calculate movement command data including speed information and position information on the plurality of tools, such that respective cutting paths of the plurality of tools intersect, based on the operation method and the operation condition input by the chip division information input unit;
   an interpolation unit configured to generate interpolation data based on the movement command data; and
   a servo control unit configured to control a motor for driving the machine based on the interpolation data, wherein the movement command data calculated by the multi-tool operation calculation unit includes data related to a movement command in which simultaneous cutting from different positions is performed with a plurality of cutting tools including a first tool and a second tool different from the first tool among the plurality of tools.

2. The numerical controller according to claim 1, wherein the movement command data calculated by the multi-tool operation calculation unit is data related to a movement command for repeating between the plurality of tools an operation in which,
   with respect to one of the plurality of tools performing cutting, another tool different from the tool performing the cutting enters a cutting point ahead of a path of non-cutting of the tool performing the cutting and,
   after chips by the tool performing the cutting are divided, cutting by the other tool continues.

3. The numerical controller according to claim 1, wherein the movement command data calculated by the multi-tool operation calculation unit is data related to a movement command for the second tool different from the first tool entering a cutting point ahead of a path of non-cutting of the first tool during cutting by the first tool to divide chips by the first tool.

4. The numerical controller according to claim 1, wherein the movement command data calculated by the multi-tool operation calculation unit is data related to a movement command for repeating between the plurality of tools an operation in which
   cutting by one of the plurality of tools performing cutting is performed, and
   after the cutting is interrupted, another tool different from the tool performing the cutting is positioned in a cutting groove cut by the tool performing the cutting and the interrupted cutting continues.

5. The numerical controller according to claim 1, wherein the movement command data calculated by the multi-tool operation calculation unit is data related to a movement command for repeating an operation in which:
   the plurality of cutting tools are retracted from the workpiece when the second tool reaches a cutting groove cut by the first tool, and another tool among the plurality of cutting tools different from the first tool is moved to an end position of the cutting groove cut by the first tool with a relative front-back relationship between the plurality of cutting tools maintained for the cutting by the plurality of cutting tools to continue.

* * * * *